US012791158B2

(12) United States Patent
Giraud et al.

(10) Patent No.: US 12,791,158 B2

(45) Date of Patent: Nov. 10, 2026

(54) LIGHT MODULE WITH A LENS IMAGING THE ILLUMINATED SURFACE OF A COLLECTOR AND A SCREEN BLOCKING STRAY DIRECT RAYS

(71) Applicant: VALEO VISION, Bobigny (FR)

(72) Inventors: Sylvain Giraud, Bobigny (FR); Pierre Placais, Bobigny (FR)

(73) Assignee: Valeo Vision, Bobigny (FR)

( * ) Notice: Subject to any disclaimer, the term of this patent is extended or adjusted under 35 U.S.C. 154(b) by 30 days.

(21) Appl. No.: 18/850,173

(22) PCT Filed: Mar. 28, 2023

(86) PCT No.: PCT/EP2023/058028

§ 371 (c)(1),
(2) Date: May 22, 2025

(87) PCT Pub. No.: WO2023/186915

PCT Pub. Date: Oct. 5, 2023

(65) Prior Publication Data

US 2025/0305651 A1 Oct. 2, 2025

(30) Foreign Application Priority Data

Mar. 28, 2022 (FR) ....................................... 2202767

(51) Int. Cl.

*F21S 41/40* (2018.01)
*F21S 41/148* (2018.01)
(Continued)

(52) U.S. Cl.

CPC ............. *F21S 41/40* (2018.01); *F21S 41/148* (2018.01); *F21S 41/25* (2018.01); *F21S 41/32* (2018.01)

(58) Field of Classification Search

CPC .......... F21S 41/25; F21S 41/32; F21S 41/255; F21S 41/40; F21S 41/43; F21S 41/47; F21S 41/148; F21S 41/321; F21W 2102/135

See application file for complete search history.

(56) References Cited

U.S. PATENT DOCUMENTS 4,967,319 A * 10/1990 Seko ...................... B60Q 1/076 362/466
7,316,488 B2 1/2008 Wall, Jr.
(Continued)

FOREIGN PATENT DOCUMENTS

CN 101387378 A 3/2009
CN 209165285 U 7/2019
(Continued)

OTHER PUBLICATIONS

Search English translation of DE 102007007839 A1 (Year: 2007).*
(Continued)

*Primary Examiner* — Omar Rojas Cadima
(74) *Attorney, Agent, or Firm* — Valeo Vision

(57) ABSTRACT

The invention relates to a light module including a light source capable of emitting light rays, a plate bearing the light source, a collector with a reflective surface configured to collect and reflect the light rays into a reflected light beam along an optical axis, an optical system configured to project the reflected light beam by imaging a portion of the reflective surface, a screen located in front of the light source, in a main direction of propagation of the reflected light beam, and configured to collect light rays coming directly from the source, which rays are referred to as direct rays. The screen extends in a transverse direction with a constant cross-section and is arranged on the plate.

10 Claims, 3 Drawing Sheets

(51) Int. Cl.

| | |
|---|---|
| ***F21S 41/25*** | (2018.01) |
| ***F21S 41/32*** | (2018.01) |

(56) References Cited

U.S. PATENT DOCUMENTS

| | | | |
|---|---|---|---|
| 7,635,206 | B2 | 12/2009 | Huang |
| 8,439,539 | B2 | 5/2013 | Yamamoto |
| 9,188,297 | B2 | 11/2015 | Naganawa |
| 10,259,379 | B2 | 4/2019 | Makino |
| 11,022,266 | B2 | 6/2021 | Hermitte et al. |
| 12,435,852 | B2 | 10/2025 | Bai et al. |

FOREIGN PATENT DOCUMENTS

| | | | | |
|---|---|---|---|---|
| CN | 216047401 | U | 3/2022 | |
| CN | 217131136 | U | 8/2022 | |
| DE | 102007007839 | A1 * | 9/2007 | ........... B60Q 1/0094 |
| DE | 102010012137 | A1 | 3/2011 | |
| EP | 2375142 | A2 * | 10/2011 | ............ F21S 41/192 |
| EP | 3708904 | A1 | 9/2020 | |
| FR | 3122479 | A1 | 11/2022 | |
| JP | 2011165965 | A | 8/2011 | |
| JP | 2013258078 | A | 12/2013 | |
| JP | 2014107015 | A | 6/2014 | |
| JP | 2014175102 | A | 9/2014 | |
| KR | 20150072070 | A | 6/2015 | |
| WO | 2012079104 | A1 | 6/2012 | |
| WO | 2017191044 | A1 | 11/2017 | |
| WO | 2019124238 | A1 | 6/2019 | |
| WO | 2020025171 | A1 | 2/2020 | |
| WO | 2022129420 | A1 | 6/2022 | |

OTHER PUBLICATIONS

Search English translation of EP 2375142 A2 (Year: 2011).*

European Patent Office, International Search Report (with English translation) and Written Opinion of corresponding International Application No. PCT/EP2023/058028, dated Jul. 10, 2023.

Japan Patent Office, Office Action (with English translation) of corresponding Japanese Patent Application No. 2024-557563, dated Aug. 1, 2025, 11 pages.

Japan Patent Office, Search Report (with English translation) of corresponding Japanese Patent Application No. 2024-557563, dated Jul. 31, 2025, 23 pages.

* cited by examiner

LIGHT MODULE WITH A LENS IMAGING THE ILLUMINATED SURFACE OF A COLLECTOR AND A SCREEN BLOCKING STRAY DIRECT RAYS

TECHNICAL FIELD

The invention relates to the technical field of lighting and signaling, more particularly for applications in the automotive field.

BACKGROUND OF THE INVENTION

It is generally known practice to produce a cutoff lighting beam by using one or more luminous modules with a folder. Such a luminous module conventionally comprises a collector with a reflective surface of revolution having an elliptical profile, in the form of a cap in a half-space delimited by a horizontal plane. A substantially point source of light, of the light-emitting diode type, is located at a first focal point on the reflective surface and shines into the half-space in the direction of said surface. The rays are thus reflected in a convergent manner toward a second focal point on the reflective surface. Another, generally flat, reflective surface with a cutoff edge at the second focal point ensures an upward reflection of the rays which do not pass precisely through the second focal point, these rays then being refracted by a thick lens toward the bottom of the lighting beam. This reflective surface is commonly referred to as a "folder" in that it "folds", toward the top of the projection lens, those rays which would otherwise form an upper portion of the lighting beam. Such a luminous module has the drawback of requiring the folder and the cutoff edge to be positioned with a high degree of precision. Also, the projection lens must be a thick lens because of its small focal length, thus increasing its weight and complicating its production, notably as regards sink marks. In addition, the collector has a certain height and, thus, a certain height-wise bulk.

The published patent document WO 2020/025171 A1 discloses a luminous module, in particular for an automotive vehicle, comprising a collector with a reflective surface collecting and reflecting the light rays emitted by a light source in a light beam, similar to a luminous module with a folder. The luminous module also comprises a projection optical system, such as a lens, specifically configured to project the light beam in question by forming an image of the reflective surface of the collector. To this end, the projection optical system has a focal point located on the reflective surface, for example at a rear edge of the latter, so as to correctly image said edge and form a clean cut in the projected light beam. Certain rays emitted by the light source and not reflected by the reflective surface of the collector can, however, reach the projection optical system and degrade the projected light beam. To this end, a screen, which is a blocker, disposed in front of the light source is provided. This teaching does not address the production of the screen or blocker, in particular in the context of industrial use.

SUMMARY OF THE INVENTION

The aim of the invention is to mitigate at least one of the drawbacks of the abovementioned prior art. More specifically, an objective of the invention is to provide a use of the screen from the prior art which performs well in optical terms and can be utilized in industry.

A subject of the invention is a luminous module comprising a light source capable of emitting light rays; a plate supporting the light source; a collector with a reflective surface configured to collect and reflect the light rays in a reflected light beam along an optical axis; an optical system configured to project the reflected light beam by imaging part of the reflective surface; a screen which is in front of the light source, along a main direction of propagation of the reflected light beam, and is configured to gather light rays coming directly from the source, referred to as direct rays; and notable in that the screen extends along a transverse direction with a constant cross section and is disposed on the plate.

"Direct rays" are understood to mean the light rays which, in the absence of the screen, are likely to directly reach the entry face of the optical system, or in other words to reach the entry face of the optical system without having to be deflected beforehand by an optical element, in particular by the reflective surface. These direct rays, in particular those emitted parallel or virtually parallel to the optical axis, might contribute to the light beam projected in the absence of the screen without having to be shaped by the collector and the reflective surface, and this is not desirable.

Advantageously, the collector and the reflective surface have the form of a cap or half-shell. Advantageously, the reflective surface has an elliptical or parabolic profile exhibiting symmetry of revolution about an axis parallel to the optical axis.

According to an advantageous embodiment of the invention, the transverse direction is perpendicular to the optical axis.

According to an advantageous embodiment of the invention, the screen has an end face, opposite the plate, which is convex. The end face may also be referred to as end zone. This end face, or end zone, corresponds to the opposite side of the screen to the side of the screen that faces toward the plate. As will be seen below, the end face, or the end zone, may be continuous or have multiple faces or portions separated by an edge corner.

According to an advantageous embodiment of the invention, the end face of the screen has a profile comprising a rounded portion with a radius of curvature greater than or equal to 0.1 mm and/or a straight portion which is inclined by at least 10° toward the rear and the plate. The profile in question is transverse to the main direction of the screen, corresponding to the transverse direction, which means that the profile is in a longitudinal plane parallel to the optical axis.

According to an advantageous embodiment of the invention, the screen has a rear face which gathers the direct rays and is at a distance d, along the optical axis, from the light source that is less than or equal to 10 mm, preferably less than or equal to 4 mm. Advantageously, the distance d is measured between a front edge of the light source and a rear edge of the rear face of the screen.

According to an advantageous embodiment of the invention, the rear face of the screen is part of the end face of the screen. In particular, all or part of the rear face of the screen can be part of the end face of the screen. At least part of the rear face then forms a portion of the end face.

Said part of the rear face forming a portion of the end face may form a continuous face with the rest of the end face of the screen, which is to say that said part of the rear face is not separated from the rest of the end face by an edge corner.

As an alternative, said part of the rear face forming a portion of the end face of the screen may be separated from the rest of the end face of the screen by an edge corner. The end face may then comprise one or more edge corners separating different faces or portions.

According to an advantageous embodiment of the invention, the cross section of the screen is triangular, circular, oval or pentagonal.

According to an advantageous embodiment of the invention, the screen is made of a metal material.

According to an advantageous embodiment of the invention, the screen is attached to the plate by welding, soldering and/or adhesive bonding.

According to an advantageous embodiment of the invention, the screen is free of surface treatment of the light-reflecting or light-absorbing type.

The measures of the invention are advantageous in that they make it possible to place the screen in the vicinity of the light source, and this makes it possible to reduce a size, in particular a height, of the screen, and this means the rays of the reflected light beam are not intercepted, and also the plate is not extended toward the front beyond the screen and a cooling radiator for the light source is not equally extended, underneath the plate, which is to say on a face opposite that supporting the light source. The measures of the invention are also advantageous from an industrialization perspective, in that the screens can be cut from a bar that has the desired cross section and in that they make it possible to position and attach the screens on and to various plate models as desired.

DETAILED DESCRIPTION OF THE INVENTION

In the following description, the concepts "front" and "rear" refer to a main direction of propagation of rays along the optical axis.

Figure 1:
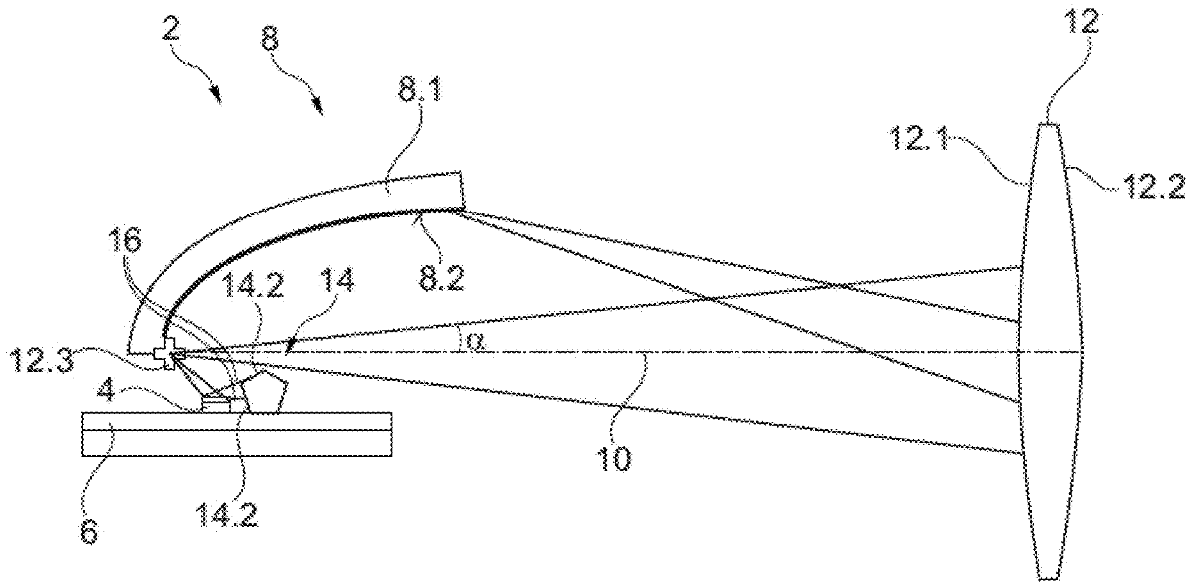
FIG. 1 is a schematic representation, in side view, of a luminous module according to a first embodiment of the invention.
Figure 2:
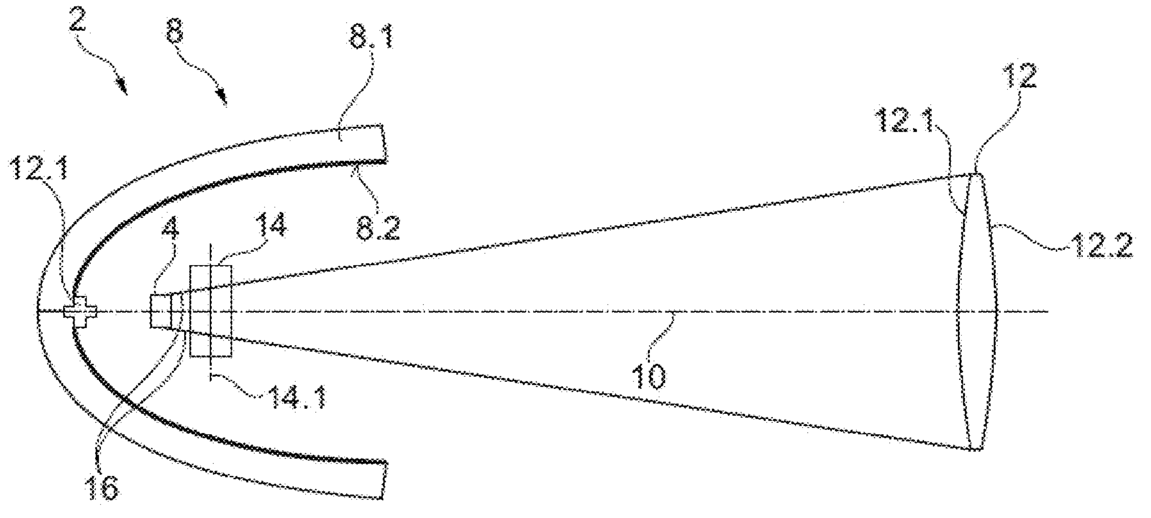
FIG. 2 is a schematic representation, in top view, of the luminous module in FIG. 1.
Figure 3:
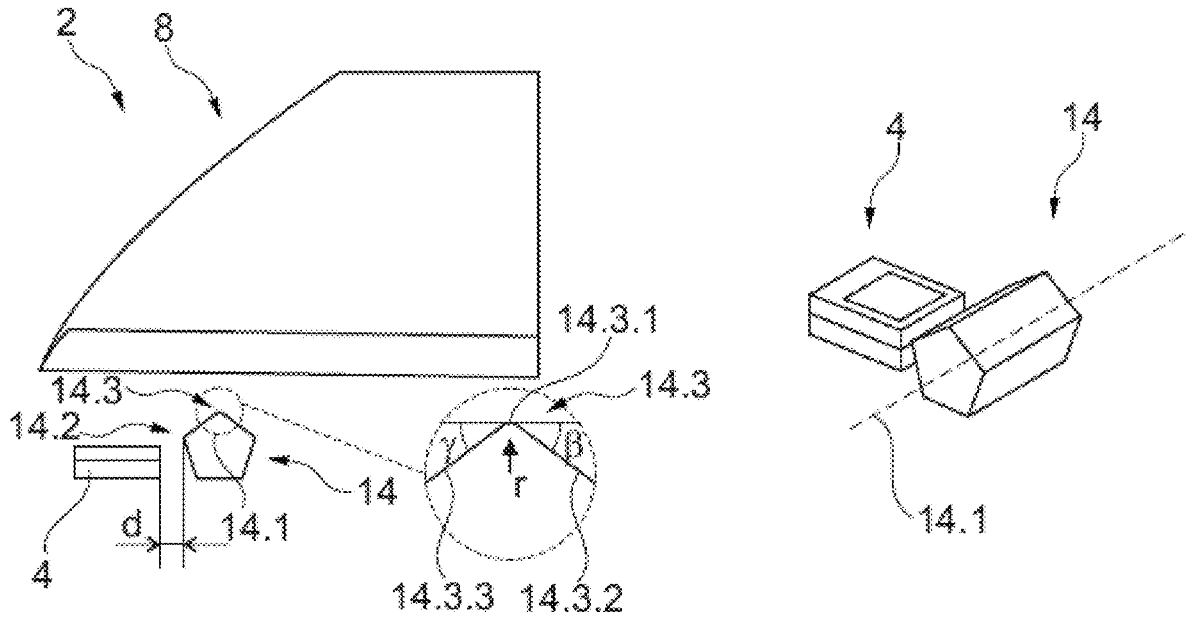
FIG. 3 is a perspective illustration, in side view, of the light source, the screen and the collector of the luminous module of the first embodiment of the invention.

FIGS. 1 to 3 illustrate a luminous module according to a first embodiment of the invention.

FIG. 1 is a schematic side view of the luminous module 2.

The luminous module 2 essentially comprises a light source 4, a plate 6 supporting the light source 4, a collector 8 capable of reflecting the light rays emitted by the light source 4 in order to form a reflected light beam along an optical axis 10 of the module, and a projection lens 12 for projecting said beam. Projection optical systems other than the projection lens are conceivable, such as in particular one or more mirrors.

Here, as generally according to the invention, the light source 4 is advantageously of the semiconductor type, such as in particular a luminous diode. In particular, the light source 4 emits light rays in a half-space delimited by the main plane of said source, in a main direction perpendicular to said plane and to the optical axis 10.

The collector 8 comprises a main body 8.1 in the form of a shell or cap, and a reflective surface 8.2 on the inner face of the main body 8.1. The reflective surface 8.2 can advantageously have a profile of the elliptical or parabolic type. It is advantageously a surface of revolution about an axis parallel to the optical axis. As an alternative, it may be a free-form surface. It may also have multiple sectors. The collector 8 in the form of a shell or cap is advantageously made of materials having good heat resistance, for example glass or synthetic polymers such as polycarbonate (PC) or polyether imide (PEI).

The expression "parabolic type" generally applies to reflectors of which the surface has a single focal point, i.e. one region of convergence of the light rays, such that the light rays emitted by a light source placed in this region of convergence are projected to a great distance after reflection from the surface. "Projected to a great distance" means that these light rays do not converge toward a region located at least at 10 times the dimensions of the reflector. In other words, the reflected rays do not converge toward a region of convergence or, if do they converge, this region of convergence is located at a distance greater than or equal to 10 times the dimensions of the reflector. It is therefore possible for a surface of the parabolic type to have or not to have parabolic portions. A reflector having such a surface is in particular used alone to create a light beam.

The light source 4 is disposed at a focal point on the reflective surface 8.2 so that its rays are collected and reflected in a reflected light beam along the optical axis. At least some of these reflected rays have angles of inclination a in relation to said optical axis which are less than or equal to 10°, so as to be under what are referred to as Gaussian conditions, making it possible to obtain stigmatism, which is to say sharpness of the projected image. The rays are advantageously reflected by the rear portion of the reflective surface 8.2.

The projection lens 12 is advantageously a biconvex lens, which is to say with a convex entry face 12.1 and a convex exit face 12.2. The lens 12 is referred to as thin, for example less than 6 mm, due to the low inclination of the rays to be deflected. The lens 12 has a focal point 12.3 which is located, along the optical axis 10, at the light source 4 or behind said source. In the present case the focal point 12.3 is located on the reflective surface 8.2 of the collector 8, more precisely at its rear edge, here also the lower edge.

If the reflective surface is of the elliptical type, it has a second focal point situated in front of the lens 12 and at a distance from the optical axis 10. It should be noted that it is also possible for this focal point to be located to the rear of the lens and/or on the optical axis, preferably in the vicinity of the lens, so as to reduce the width of the beam at the input face of the lens.

The luminous module 2 comprises a screen 14 disposed in front of the light source 4 and facing the reflective surface 8.2 of the collector 8, with a rear face 14.2 capable of collecting the direct light rays 16 that are emitted forward directly by the source 4 in question, which is to say do not meet the reflective surface 8.2. Such a measure is useful for avoiding the presence of parasitic light rays likely to participate in the formation of the light beam without, however, being strictly speaking imaged. These direct rays 16, in particular those which are parallel or virtually parallel to the optical axis 10, will then potentially illuminate an upper portion of the light beam, and this is not desirable in the case of a cutoff lighting beam.

FIG. 2 is a schematic top view of the luminous module 2 in FIG. 1.

It can be observed that the screen extends along the transverse direction 14.1 which is preferably perpendicular to the optical axis 10 and preferably parallel to the plate 6. The screen extends along the transverse direction 14.1 so as to intercept or gather the direct light rays that, in the absence of the screen 14, are likely to reach the entry face 12.1 of the projection lens 12 and to disrupt the projected light beam. This makes it possible as a result to intercept these parasitic rays. The screen has a constant cross section along the transverse direction 14.1. In the present case, the cross section in question is pentagonal, more particularly a regular pentagon. One of the five sides of the pentagon is placed against the plate 6 and two adjacent sides, located to the rear of the screen and adjacent to the side disposed against the plate 6, form the rear face 14.2 of the screen 14.

The screen 14 is advantageously made from a metal and/or plastic material, in particular by extrusion. Its cross section is advantageously planar, which is to say free of recesses or voids of material.

The rear face 14.2 of the screen 12 is advantageously free of surface treatment of the light-reflecting or light-absorbing type. The proportion of the direct light rays 16 incident on the rear face 14.2 in question that is reflected is in reality reflected partially toward the reflective surface 8.2 of the collector 8 and partially toward the plate. The proportion of direct light rays 16 reflected towards the plate is then largely absorbed there. The proportion of direct light rays 16 reflected toward the reflective surface 8.2 of the collector 8 is reflected at angles of incidence such that they are then reflected forward at a distance from the lens 12. It is, however, possible to provide an absorbing or reflective optical treatment or coating on the rear face 14.2, in particular depending on various parameters such as the material of the screen and the overall geometry of the luminous module. In the case of a reflective treatment or coating, it is then conceivable to provide an absorption region capable of absorbing the direct light rays thus reflected.

FIG. 3 is a perspective illustration, in side view, of the light source, the screen and the collector of the luminous module 2 in FIGS. 1 and 2.

It can be observed that the distance d, along the optical axis (not shown but corresponding to a direction horizontal to FIG. 3), between the light source 4 and the screen 14, is reduced, preferably less than or equal to 4 mm. This distance is measured between a front edge of the light source 4 and a rear edge of the screen, more specifically a rear edge of the rear face 14.2 of the screen 14. This reduced distance affords an advantage in optical terms in that the screen can thus gather and block the direct light rays while at the same time not intercepting any of the light rays reflected by the reflective surface 8.2 of the collector 8. Specifically, giving consideration to the left-hand part in FIG. 3, it will be easily understood that bringing the screen 14 closer to the light source 4 makes it possible to reduce its height and, taking that as a starting point, to put its end face 14.3 that is opposite the plate (not shown in FIG. 3) at a distance from the collector 8 and from its reflective surface 8.2. This distance makes it possible to avoid any interference with the reflected light rays.

It is also possible to observe that the end face of the screen 14, also referred to as end zone, has a convex profile. In the present case, it comprises a rounded portion 14.3.1 with a radius of curvature r and two straight portions 14.3.2 and 14.3.3 that are inclined at an angle β and γ, respectively, in relation to a direction parallel to the optical axis. These two straight portions 14.3.2 and 14.3.3 are on either side of the rounded portion 14.3.1, which is then central. The end face 14.3 is thus formed by a continuous surface formed by the rounded portion 14.3.1 and the two straight portions 14.3.2 and 14.3.3.

The rear straight portion 14.3.3 is part of the rear face 14.2. In particular, that side of the pentagon that is at the rear of the screen and not adjacent to the side placed against the plate forms the rear straight portion 14.3.3. Part of the rear face 14.2 of the screen is therefore part of the end face 14.3 of the screen.

The rear straight portion 14.3.3 is inclined toward the rear and toward the plate (not shown) by the angle γ which is advantageously greater than or equal to 10°. The front straight portion 14.3.2 is inclined toward the front and toward the plate by the angle β. The radius of curvature r is advantageously greater than or equal to 0.1 mm and/or less than 1 mm. This radius of curvature r and the angle γ allowing the direct light rays incident on said rear straight portion 14.3.3 and said rounded portion 14.3.1 to be reflected so as to not reach the projection lens (not shown).

Figure 4:
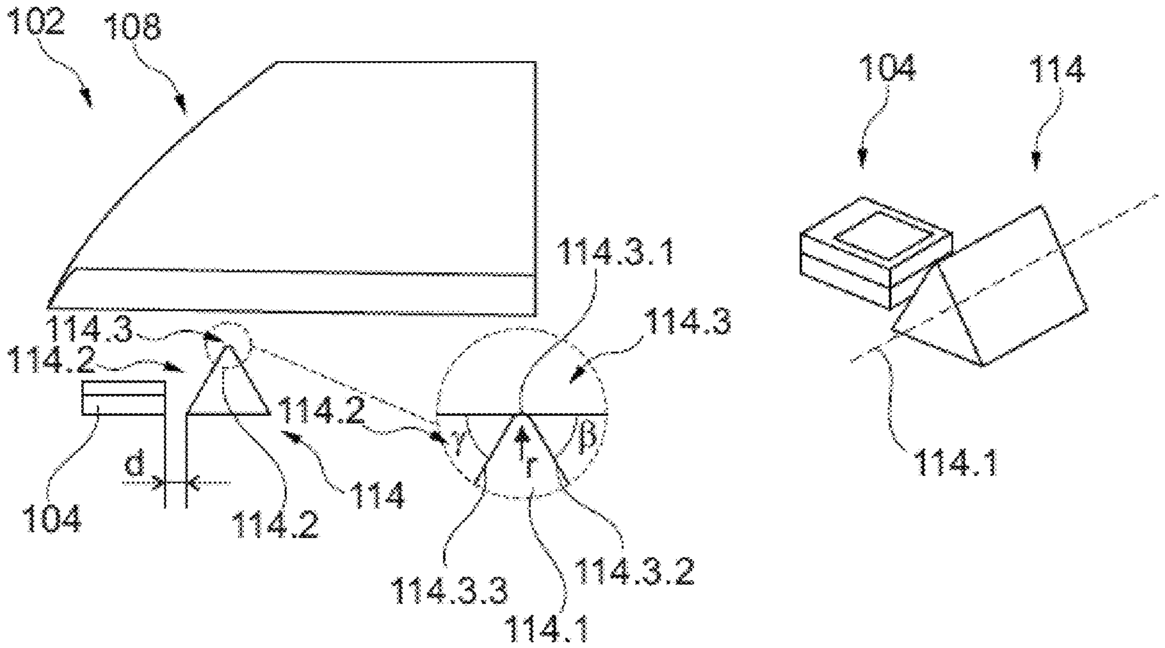
FIG. 4 is a perspective illustration, in side view, of the light source, the screen and the collector of a luminous module according to a second embodiment of the invention.

FIG. 4 is a perspective illustration, in side view, of the light source, the screen and the collector of a luminous module according to a second embodiment of the invention.

The reference numbers of the first embodiment have been used to designate corresponding or identical elements, these numbers however being increased by 100. Reference is additionally made to the description of these elements within the context of the first embodiment of the invention.

The luminous module 102 differs from the luminous module 2 of the first embodiment solely in that the screen 114 has a triangular and no longer pentagonal cross section. The triangular cross section is preferably an equilateral triangle. The distance d, along the optical axis (not shown but corresponding to a direction horizontal to FIG. 4), between the light source 104 and the screen 114, is similarly reduced, preferably less than or equal to 4 mm.

The end face 114.3 of the screen 114 is somewhat different than that of the screen 14 of the first embodiment of the invention, essentially in that the inclinations β and γ of the front straight portion 114.3.2 and rear straight portion 114.3.3 are greater. The end face 114.3 is formed by a continuous surface formed by the rounded portion 114.3.1 and the two straight portions 114.3.2 and 114.3.3.

The rear face 114.2 is also formed integrally by the rear straight portion 114.3.3. All of the rear face 114.2 of the screen is therefore part of the end face 114.3 of the screen.

This arrangement means that the proportion of the direct light rays reflected by the rear face 114.2 is totally reflected in the direction of the collector 8, by contrast to the first embodiment in which a proportion is reflected toward the plate (not shown).

Figure 5:
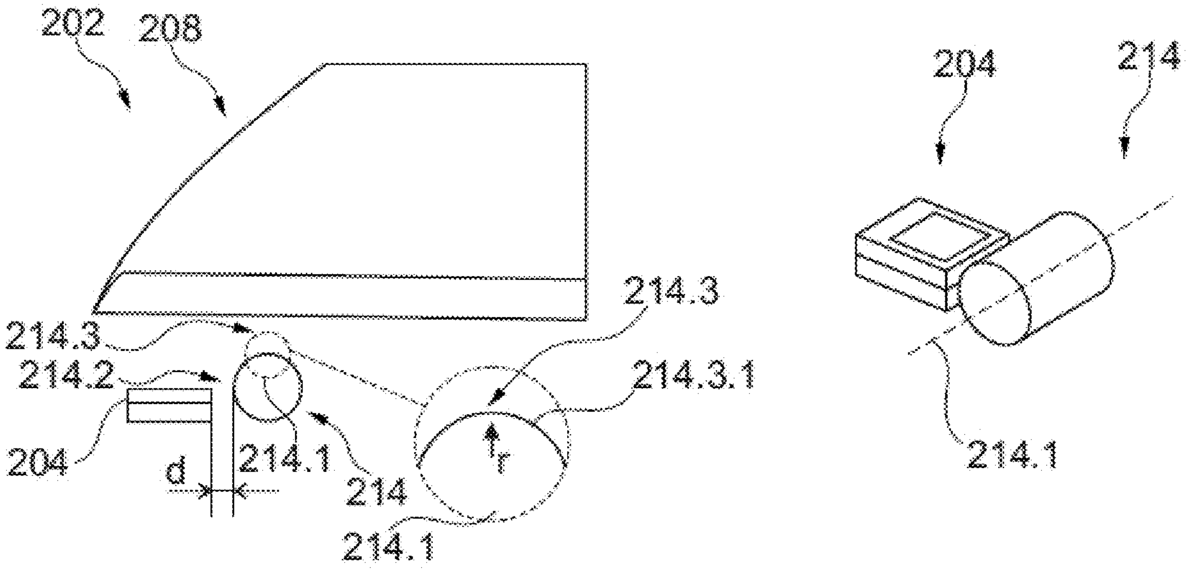
FIG. 5 is a perspective illustration, in side view, of the light source, the screen and the collector of a luminous module according to a third embodiment of the invention.

FIG. 5 is a perspective illustration, in side view, of the light source, the screen and the collector of a luminous module according to a third embodiment of the invention.

The reference numbers of the first embodiment have been used to designate corresponding or identical elements, these numbers however being increased by 200. Reference is additionally made to the description of these elements within the context of the first embodiment of the invention.

The luminous module 202 differs from the luminous module 2 of the first and second embodiments solely in that the screen 214 has a circular and no longer pentagonal or triangular cross section. The circular cross section preferably has a constant radius over its entire periphery, although it should be understood that this cross section may have a certain ovality, in particular the shape of an ellipse. The distance d, along the optical axis (not shown but corresponding to a direction horizontal to FIG. 5), between the light source 204 and the screen 214, is similarly reduced, preferably less than or equal to 4 mm.

The end face 214.3 of the screen 214 is convex. It is different than those of the screens 14 and 114 of the first and second embodiments of the invention essentially in that this face comprises a single portion which in the present case is a rounded portion 214.3.1, which is to say does not have any straight portion. This rounded portion has a radius of curvature r which may be considerably larger than the radius of curvature r of the rounded portions 14.3.1 and 114.3.1 of the first and second embodiments of the invention.

The rear face 214.2 is also formed integrally by the rounded portion 214.3.1. All of the rear face 214.2 of the screen 214 is therefore part of the end face 214.3 of the screen 214. Similarly to the first embodiment and by contrast to the second embodiment, owing to the rounded shape of the rear face 214.2, a proportion of the direct light rays reflected by the rear face 214.2 is reflected in the direction of the collector 208 and another is reflected in the direction of the plate (not shown).

In general, in particular for the three embodiments described above, the screen may be attached to the plate by welding, soldering and/or adhesive bonding. The screen is advantageously made from a metal material, in particular by extrusion. Attachment by soldering and/or welding is particularly suitable in this case. The necessary length can be cut from a bar having the desired cross section, like one of those presented above.

Still generally, the total height of the screen, in a direction perpendicular to the optical axis, advantageously ranges between 0.5 and 5 mm.

It should be understood that shapes other than the pentagonal, triangular and circular shapes are conceivable as long as the rear face is able to absorb the direct light rays or reflect them toward the plate and/or toward the collector such that, after being reflected by the reflective surface of the collector, these rays do not reach the projection optical system, in the present case the projection lens.

The luminous modules of the invention can be used to form standard luminous light beams for an automotive vehicle, such as in particular a low-beam lighting function, or high-beam lighting function. These functions are well known per se to those skilled in the art.

What is claimed is:

1. A luminous module comprising:

a light source capable of emitting light rays;

a plate supporting the light source;

a collector with a reflective surface configured to collect and reflect the light rays in a reflected light beam along an optical axis;

an optical system configured to project the reflected light beam by imaging part of the reflective surface;

a screen which is in front of the light source, along a main direction of propagation of the reflected light beam, and is configured to block light rays coming directly from the light source, referred to as direct rays, with the direct rays being capable of directly reaching an input face of the optical system if not for the screen; and the screen extends along a transverse direction with a constant cross section and is disposed on the plate and in that the screen has an end face, opposite the plate, which is convex, and which has a transverse profile including a rounded portion with a radius of curvature r greater than or equal to 0.1 mm and less than 1 mm, with the rounded portion being farthest from the plate.

2. The luminous module as claimed in claim 1, wherein the transverse direction is perpendicular to the optical axis.

3. The luminous module as claimed in claim 2, wherein the rear face of the screen is part of an end face of the screen.

4. The luminous module as claimed in claim 1, wherein the screen has a rear face which gathers the direct rays and is at a distance, along the optical axis, from the light source that is less than or equal to 10 mm.

5. The luminous module as claimed in claim 1, wherein the cross section of the screen is triangular, circular, oval or pentagonal.

6. The luminous module as claimed in claim 1, wherein the screen is made of a metal material.

7. The luminous module as claimed in claim 1, wherein the screen is attached to the plate by welding, soldering and/or adhesive bonding.

8. The luminous module as claimed in claim 1, wherein the screen is free of surface treatment of the light-reflecting and/or light-absorbing type.

9. The luminous module as claimed in claim 1, wherein the screen has a rear face which gathers the direct rays and is at a distance, along the optical axis, from the light source that is less than or equal to 4 mm.

10. The luminous module as claimed in claim 1, wherein the transverse profile includes a straight portion which is inclined by at least 10° toward the rear and the plate.

* * * * *